(12) United States Patent
Usoro et al.

(10) Patent No.: US 6,656,077 B2
(45) Date of Patent: Dec. 2, 2003

(54) FAMILY OF MULTI-SPEED TRANSMISSION MECHANISMS HAVING INPUT CLUTCHES AND THREE PLANETARY GEARSETS

(75) Inventors: Patrick Benedict Usoro, Troy, MI (US); Madhusudan Raghavan, West Bloomfield, MI (US); Norman Kenneth Bucknor, Troy, MI (US)

(73) Assignee: General Motors Corporation, Detroit, MI (US)

( * ) Notice: Subject to any disclaimer, the term of this patent is extended or adjusted under 35 U.S.C. 154(b) by 25 days.

(21) Appl. No.: 10/133,108

(22) Filed: Apr. 26, 2002

(65) Prior Publication Data

US 2003/0203785 A1 Oct. 30, 2003

(51) Int. Cl.[7] ............................................. F16H 3/62
(52) U.S. Cl. ................................. 475/275; 475/296
(58) Field of Search .............................. 475/275, 296

(56) References Cited

U.S. PATENT DOCUMENTS

| | | | |
|---|---|---|---|
| 4,070,927 A | 1/1978 | Polak ........................... | 74/765 |
| 5,106,352 A | 4/1992 | Lepelletier ................... | 475/280 |
| 5,542,889 A | 8/1996 | Pierce et al. ................. | 475/275 |
| 5,599,251 A | 2/1997 | Beim et al. ................... | 475/275 |
| 5,772,552 A | * 6/1998 | Ibaraki et al. ............... | 475/281 |
| 6,071,208 A | 6/2000 | Koivunen ..................... | 475/275 |
| 6,083,135 A | 7/2000 | Baldwin et al. .............. | 475/276 |
| 6,315,692 B1 | * 11/2001 | Takahashi et al. ........... | 475/116 |
| 6,530,858 B1 | * 3/2003 | Usoro et al. ................. | 475/296 |

FOREIGN PATENT DOCUMENTS

EP        1033 510 A1        9/2000

* cited by examiner

Primary Examiner—Dirk Wright
(74) Attorney, Agent, or Firm—Kathryn A. Marra (57) ABSTRACT

A family of power transmissions includes three planetary gearsets and five torque-transmitting mechanisms that are selectively engaged to produce at least six forward speed ratios and one reverse speed ratio between an input shaft and an output shaft. The planetary gearsets are arranged such that a member of the first of the planetary gearsets is continuosly interconnected with a member of the second planetary gearset, and a member of the second planetary gearset is continuously interconnected with a member of the third planetary gearset. At least one member of either the first or second planetary gearset is continuously connected with a transmission housing and at least one member of one of the planetary gearsets is connected with the transmission output shaft. The transmission input shaft is selectively connectible with the planetary gearsets only through at least two rotating type torque-transmitting mechanisms. The torque-transmitting mechanisms are engaged in combinations of three to establish at least six forward speed ratios and one reverse speed ratio between the input shaft and the output shaft of the transmission.

4 Claims, 6 Drawing Sheets

FIG. 1

| | RATIOS | 58 | 50 | 52 | 54 | 56 |
|---|---|---|---|---|---|---|
| REVERSE | -2.02 | X | X | | | X |
| NEUTRAL | 0 | | X | | | X |
| 1 | 2.76 | | X | | X | X |
| 2 | 1.58 | | | X | X | X |
| 3 | 1.00 | | X | X | | X |
| 4 | 0.67 | | X | X | X | |
| 5 | 0.46 | X | X | X | | |
| 6 | 0.375 | X | | X | X | |

(X=engaged)

Ring Gear/Sun Gear Tooth Ratios: $\frac{R1}{S1}=2.33, \frac{R2}{S2}=2.37, \frac{R3}{S3}=1.67$

| Ratio Spread | 7.37 |
|---|---|
| Ratio Steps | |
| REV/1 | -0.73 |
| 1/2 | 1.74 |
| 2/3 | 1.58 |
| 3/4 | 1.50 |
| 4/5 | 1.45 |
| 5/6 | 1.23 |

| | RATIOS | 150 | 152 | 154 | 156 | 158 |
|---|---|---|---|---|---|---|
| REVERSE | -2.57 | X | X | X | | |
| NEUTRAL | 0 | | X | X | | |
| 1 | 3.12 | | X | X | | X |
| 2 | 1.53 | | X | X | X | |
| 3 | 1.00 | | X | | X | X |
| 4 | 0.76 | X | X | | X | |
| 5 | 0.53 | X | | | X | X |
| 6 | 0.40 | X | X | | | X |

(X=engaged)

Ring Gear/Sun Gear Tooth Ratios: $\frac{R1}{S1}=1.84, \frac{R2}{S2}=3.00, \frac{R3}{S3}=1.88$

| Ratio Spread | 7.89 |
|---|---|
| Ratio Steps | |
| REV/1 | -0.82 |
| 1/2 | 2.04 |
| 2/3 | 1.53 |
| 3/4 | 1.31 |
| 4/5 | 1.44 |
| 5/6 | 1.34 |

| | RATIOS | 250 | 252 | 254 | 256 | 258 |
|---|---|---|---|---|---|---|
| REVERSE | -2.83 | X | X | | | X |
| NEUTRAL | 0 | X | | | | X |
| 1 | 3.06 | X | | | X | X |
| 2 | 1.52 | X | | X | | X |
| 3 | 1.00 | X | | X | X | |
| 4 | 0.77 | X | X | X | | |
| 5 | 0.53 | | X | X | X | |
| 6 | 0.39 | X | X | | X | |

(X=engaged)

Ring Gear/Sun Gear Tooth Ratios: $\frac{R1}{S1}=1.90, \frac{R2}{S2}=2.93, \frac{R3}{S3}=1.86$

| Ratio Spread | 7.76 |
|---|---|
| Ratio Steps | |
| REV/1 | -0.92 |
| 1/2 | 2.01 |
| 2/3 | 1.52 |
| 3/4 | 1.30 |
| 4/5 | 1.44 |
| 5/6 | 1.35 |

| | RATIOS | 350 | 352 | 354 | 356 | 358 |
|---|---|---|---|---|---|---|
| REVERSE | -2.83 | X | X | | | X |
| NEUTRAL | 0 | X | | | | X |
| 1 | 3.06 | X | | | X | X |
| 2 | 1.52 | X | | X | | X |
| 3 | 1.00 | X | | X | X | |
| 4 | 0.77 | X | X | X | | |
| 5 | 0.53 | | X | X | X | |
| 6 | 0.39 | X | X | | X | |

(X=engaged)

Ring Gear/Sun Gear Tooth Ratios: $\frac{R1}{S1}=1.90, \frac{R2}{S2}=2.93, \frac{R3}{S3}=2.86$

| Ratio Spread | 7.76 |
|---|---|
| Ratio Steps | |
| REV/1 | -0.92 |
| 1/2 | 2.01 |
| 2/3 | 1.52 |
| 3/4 | 1.30 |
| 4/5 | 1.44 |
| 5/6 | 1.35 |

| | RATIOS | 450 | 452 | 454 | 456 | 458 |
|---|---|---|---|---|---|---|
| REVERSE | -2.57 | X | X | X | | |
| NEUTRAL | 0 | | X | X | | |
| 1 | 3.12 | | X | X | | X |
| 2 | 1.53 | | X | X | X | |
| 3 | 1.00 | | X | | X | X |
| 4 | 0.76 | X | X | | X | |
| 5 | 0.53 | X | | | X | X |
| 6 | 0.40 | X | X | | | X |

(X=engaged)

Ring Gear/Sun Gear Tooth Ratios: $\frac{R1}{S1}=2.84, \frac{R2}{S2}=3.00, \frac{R3}{S3}=1.88$

| Ratio Spread | 7.89 |
|---|---|
| Ratio Steps | |
| REV/1 | -0.82 |
| 1/2 | 2.04 |
| 2/3 | 1.53 |
| 3/4 | 1.31 |
| 4/5 | 1.44 |
| 5/6 | 1.34 |

| | RATIOS | 550 | 552 | 554 | 556 | 558 |
|---|---|---|---|---|---|---|
| REVERSE | -1.24 | X | X | | X | |
| NEUTRAL | 0 | X | | | X | |
| 1 | 2.28 | X | | X | | X |
| 2 | 1.58 | X | | X | X | |
| 3 | 1.00 | X | | | X | X |
| 4 | 0.76 | | X | X | X | |
| 5 | 0.48 | | X | X | | X |
| 6 | 0.35 | | X | | X | X |
| 7 | 0.27 | X | X | | | X |

(X=engaged)

Ring Gear/Sun Gear Tooth Ratios: $\frac{R1}{S1}=2.47, \frac{R2}{S2}=1.53, \frac{R3}{S3}=1.54$

| Ratio Spread | 8.53 |
|---|---|
| Ratio Steps | |
| REV/1 | -0.44 |
| 1/2 | 1.88 |
| 2/3 | 1.66 |
| 3/4 | 1.20 |
| 4/5 | 1.25 |
| 5/6 | 1.18 |
| 6/7 | 1.54 |

FIG. 12

FAMILY OF MULTI-SPEED TRANSMISSION MECHANISMS HAVING INPUT CLUTCHES AND THREE PLANETARY GEARSETS

TECHNICAL FIELD

This invention relates to multi-speed transmissions and, more particularly, to a family of transmissions having three planetary gearsets and five torque-transmitting mechanisms.

BACKGROUND OF THE INVENTION

Passenger vehicles include a powertrain that is comprised of an engine, multi-speed transmission, and a differential or final drive mechanism. The multi-speed transmission increases the overall operating range of the vehicle by permitting the engine to operate through its torque range a number of times as the transmission ratios are interchanged. The number of forward speed ratios that are available in a transmission determines the number of ratio interchanges that can occur and therefore the number of times the engine torque range can be repeated.

Early automatic transmissions had two speed ranges. This severely limited the overall speed range of the vehicle and therefore required a relatively large engine that could produce a wide speed and torque range. This resulted in the engine operating at a specific fuel consumption point, during cruising, other than the most efficient point. Therefore, manually shifted (countershaft transmissions) were the most popular.

With the advent of three and four speed automatic transmissions, the automatic shifting (planetary gear) transmission increased in popularity with the motoring public. These transmissions improve the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to five and even six speeds. This has been accomplished in many heavy truck powertrains. Six speed transmissions are disclosed in U.S. Pat. No. 4,070,927 issued to Polak on Jan. 31, 1978; U.S. Pat. No. 5,106,352 issued to Lepelletier on Apr. 21, 1992; U.S. Pat. No. 5,542,889 issued to Pierce et al. on Aug. 6, 1996; U.S. Pat. No. 5,599,251 issued to Beim and McCarrick on Feb. 4, 1997; U.S. Pat. No. 6,071,208 issued to Koivunen on Jun. 6, 2000; U.S. Pat. No. 6,083,135 issued to Baldwin et al. on Jul. 4, 2000; and European Patent Application No. EP 1 033 510 A1 published Jun. 9, 2000.

Six speed transmissions offer several advantages over four and five speed transmissions, including improved vehicle acceleration and improved fuel economy. While many trucks employ six-speed transmissions, such as Polak, passenger cars are still manufactured, for the main part, with three and four speed automatic transmissions, and relatively few five or six speed devices due to the size and complexity of these transmissions. The Polak transmission provides six forward speed ratios with three planetary gearsets, two clutches, and three brakes. The Koivunen and Beim patents utilize six torque transmitting devices including four brakes and two clutches to establish the six forward speed ratios and one reverse ratio. The Lepelletier and the EP publications each employ three planetary gearsets, three clutches and two brakes to provide six forward speed ratios and one reverse ratio. One of the planetary gearsets in each of these publications is positioned and operated to establish two fixed speed input members for the remaining two planetary gearsets.

SUMMARY OF THE INVENTION

It is an object of the present invention to provide an improved family of six-speed planetary transmissions having five torque-transmitting mechanisms and three planetary gearsets.

In one aspect of the present invention, each of the three planetary gearsets has three members comprising any one of a sun gear member, a ring gear member, or a planet carrier assembly member.

In another aspect of the present invention, the planet carrier assembly member may be either a single pinion or double pinion planetary assembly member.

In another aspect of the present invention, the first member of the first planetary gearset is continuously interconnected through an interconnecting member with a first member of the second planetary gearset.

In yet another aspect of the present invention, a second interconnecting member continuously interconnects a first member of the third planetary gearset with either the first or second member of the second planetary gearset.

In still another aspect of the present invention, the second member of the first planetary gearset, or the third member of the second planetary gearset, is continuously connected with a stationary member of the transmission, such as a transmission housing.

In yet still another aspect of the present invention, the transmission output shaft is continuously connected with at least one member of one of the planetary gearsets.

In a further aspect of the present invention, a first of the torque-transmitting mechanisms connects an input shaft of the transmission with at least one member of one of the planetary gearsets.

In yet a further aspect of the present invention, a second of the torque-transmitting mechanisms selectively interconnects the input shaft with another member of the one of the planetary gearsets or with one of the interconnecting members.

In a still further aspect of the present invention, a third of the torque-transmitting mechanisms selectively interconnects a member of the planetary gearsets with the input shaft or another member of one of the planetary gearsets.

In a yet still further aspect of the present invention, a fourth of the torque-transmitting mechanisms selectively interconnects a member of the first second or third planetary gearset with another member of the planetary gearsets.

In another aspect of the present invention, a fifth of the torque-transmitting mechanisms operates as either a clutch or a brake to selectively interconnect a member of one of the planetary gearsets with the output shaft, or another member of one of the planetary gearsets, or selectively interconnects a member of one of the planetary gearsets with the transmission housing.

In a further aspect of the present invention, the five torque-transmitting mechanisms are selectively actuated in combinations of three to establish at least six forward speed ratios and one reverse speed ratio between the transmission input shaft and the transmission output shaft.

DESCRIPTION EXEMPLARY EMBODIMENTS

Figure 1:
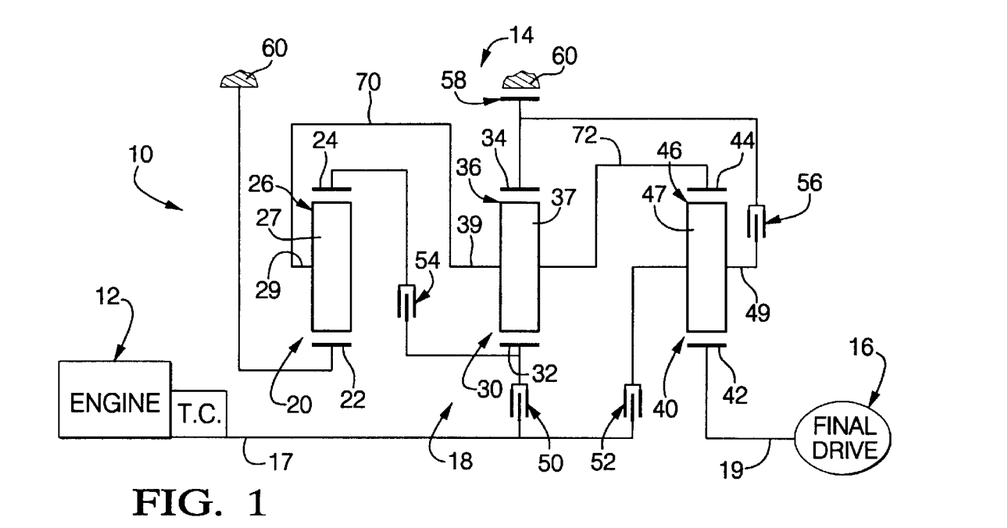
FIG. 1 is a schematic representation of a powertrain incorporating one of the family members of the present invention.

Referring to the drawings, wherein like characters represent the same or corresponding parts throughout the several views, there is seen in FIG. 1 a powertrain 10, having a conventional engine and torque converter 12, a planetary transmission 14, and a conventional final drive mechanism 16. The planetary transmission 14 includes an input shaft 17, a planetary gear arrangement 18, and an output shaft 19. The planetary gear arrangement 18 includes three planetary gearsets 20, 30, and 40, and five torque-transmitting mechanisms 50, 52, 54, 56, and 58.

The planetary gearset 20 includes a sun gear member 22, a ring gear member 24, and a planet carrier assembly member 26. The planet carrier assembly member 26 includes a plurality of pinion gears 27 rotatably mounted on a planet carrier 29 and disposed in meshing relationship with both the sun gear member 22 and the ring gear member 24.

The planetary gearset 30 includes a sun gear member 32, a ring gear member 34, and a planet carrier assembly member 36. The planet carrier assembly member 36 includes a plurality of pinion gears 37 rotatably mounted on a planet carrier 39 and disposed in meshing relationship with both the sun gear member 32 and the ring gear member 34.

The planetary gearset 40 includes a sun gear member 42, a ring gear member 44, and a planet carrier assembly member 46. The planet carrier assembly member 46 includes a plurality of pinion gears 47 rotatably mounted on a planet carrier 49 and disposed in meshing relationship with both the sun gear member 42 and the ring gear member 44.

Each of the planetary gearsets 20, 30, and 40 shows only a single pinion gear, however, as is well known in the art, the planet carrier of each of the planet carrier assembly members will support a plurality of pinion gear members, usually three or four, depending on the torque loads that are to be encountered in the planetary gearset. The torque-transmitting mechanisms 50, 52, 54, and 56 are rotating type torque-transmitting mechanisms, commonly termed clutches. The torque-transmitting mechanism 58 is a stationary type torque-transmitting mechanism, commonly termed a brake.

The planet carrier assembly member 26 and the planet carrier assembly member 36 are continuously interconnected by an interconnecting member 70. The planet carrier assembly member 36 and the ring gear member 44 are continuously interconnected by an interconnecting member 72. The sun gear member 22 is continuously connected with a transmission housing 60. The sun gear member 42 is continuously connected with the output shaft 19.

The input shaft 17 is selectively connectible with the sun gear member 32 through the torque-transmitting mechanism 50, and selectively connectible with the planet carrier assembly member 46 through the torque-transmitting mechanism 52. The sun gear member 32 and ring gear member 24 are selectively interconnectible through the torque-transmitting mechanism 54. The planet carrier assembly member 46 and the ring gear member 34 are selectively interconnectible through the torque-transmitting mechanism 56. The ring gear member 34 is selectively connectible with the transmission housing 60 through the torque-transmitting mechanism 58.

Figure 2:
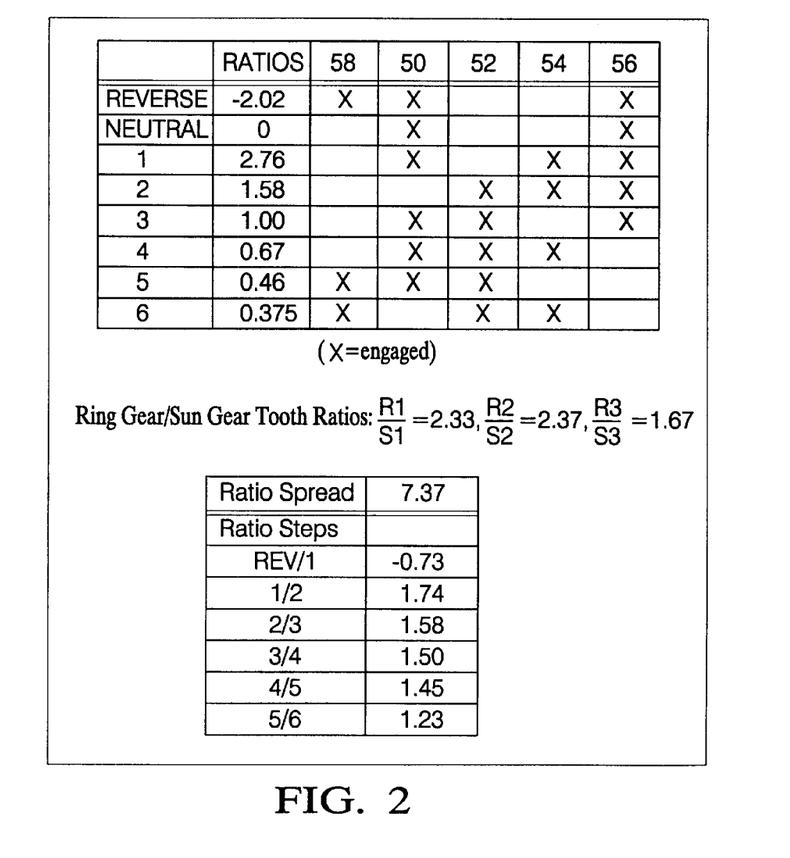
FIG. 2 is a truth table and chart depicting some of the operating characteristics of the transmission family member shown in FIG. 1.

As seen in the truth table of FIG. 2, the torque-transmitting mechanisms are engaged in combinations of three to establish six forward speed ratios and one reverse speed ratio between the input shaft 17 and the output shaft 19 through the planetary gear arrangement 18. Also given in the truth table is a numerical example of the speed ratios that are available through the planetary gear arrangement 18 when the ring gear/sun gear tooth ratios of the planetary gearsets 20, 30, and 40 are equal to the example ring gear/sun gear tooth ratios given as R1/S1, R2/S2, and R3/S3, respectively.

Further information provided in FIG. 2 is the ratio steps between adjacent forward speed ratios as well as the ratio step between the reverse and first forward speed ratio.

As will be noted from the truth table, each of the single step forward interchanges is of the single transition variety, and each of the double step forward interchanges is of the single transition variety. That is, on an interchange from first-to-second ratios, only a single torque-transmitting mechanism is swapped. For example, again on the first-to-second interchange, the torque-transmitting mechanisms 50 and 52 are swapped while the torque-transmitting mechanisms 54 and 56 remain engaged.

The reverse speed ratio is established with the engagement of the torque-transmitting mechanisms 50, 56, and 58. This combination of engagements connects the input shaft 17 with the sun gear member 32, and the ring gear member 34 and planet carrier assembly member 46 with the transmission housing 60. The planet carrier assembly member 36 and ring gear member 44 are rotated at a speed determined by the speed of the sun gear member 32 and the ring gear/sun gear tooth ratio of the planetary gearset 30. The sun gear member 42 and therefore output shaft 19 are rotated at a speed determined by the speed of the ring gear member 44 and the ring gear/sun gear tooth ratio of the planetary gearset 40. The numerical value of the reverse speed ratio is determined by the ring gear/sun gear tooth ratios of the planetary gearsets 30 and 40.

The first forward speed ratio is established with the engagement of the torque-transmitting mechanisms 50, 54, and 56. During the first forward speed ratio, the sun gear member 32 and the ring gear member 24 are driven by the input shaft 17. The sun gear member 22 is held stationary continuously by the transmission housing 60. The planet carrier assembly member 26, the planet carrier assembly member 36, and ring gear member 44 are rotated at a speed determined by the speed of the ring gear member 24 and the ring gear/sun gear tooth ratio of the planetary gearset 20. The ring gear member 34 and planet carrier assembly member 46 are rotated at a speed determined by the speed of the sun gear member 32, the speed of the planet carrier assembly member 36, and the ring gear/sun gear tooth ratio of the planetary gearset 30. The sun gear member 42 and therefore output shaft 19 are rotated at a speed determined by the speed of the ring gear member 44, the speed of the planet carrier assembly member 46, and the ring gear/sun gear tooth ratio of the planetary gearset 40. The numerical value of the first forward speed ratio is determined by the ring gear/sun gear tooth ratios of all three planetary gearsets 20, 30, and 40.

The second forward speed ratio is established with the engagement of the torque-transmitting mechanisms 52, 54, and 56. During the second forward speed ratio, the planet carrier assembly member 46 and ring gear member 34 are rotated in unison with the input shaft 17. The sun gear member 32 and ring gear member 24 are rotated at a speed determined by the speed of the ring gear member 34, the speed of the planet carrier assembly member 36, and the ring gear/sun gear tooth ratio of the planetary gearset 30. The planet carrier assembly member 26, planet carrier assembly member 36, and ring gear member 44 are rotated at a speed determined by the speed of the ring gear member 24 and the ring gear/sun gear tooth ratio of the planetary gearset 20. The sun gear member 42 and therefore output shaft 19 are rotated at a speed determined by the speed of the planet carrier assembly member 46, the speed of the ring gear member 44, and the ring gear/sun gear tooth ratio of the planetary gearset 40. The numerical value of the second forward speed ratio is determined by the ring gear/sun gear tooth ratios of all three planetary gearsets 20, 30, and 40.

The third forward speed ratio is established with the engagement of the torque-transmitting mechanisms 50, 52, and 56. During the third forward speed ratio, the sun gear member 32, planet carrier assembly member 46, and ring gear member 34, are all driven by the input shaft 17 directly. This results in the planetary gearsets 30 and 40 rotating in unison with the input shaft 17, such that the output shaft 19 also rotates in unison with the input shaft 17 and therefore the third forward speed ratio is a direct drive having a numerical value of one.

The fourth forward speed ratio is established with the engagement of the torque-transmitting mechanisms 50, 52, and 54. During the fourth forward speed ratio, the sun gear member 32, ring gear member 24, and planet carrier assembly member 46, are all rotated in unison with the input shaft 17. The planet carrier assembly member 26, planet carrier assembly member 36, and ring gear member 44 are rotated at a speed determined by the speed of the ring gear member 24 and the ring gear/sun gear tooth ratio of the planetary gearset 20. The sun gear member 42 and therefore output shaft 19 are rotated at a speed determined by the speed of the planet carrier assembly member 46, the speed of the ring gear member 44, and the ring gear/sun gear tooth ratio of the planetary gearset 40. The numerical value of the fourth forward speed ratio is determined by the ring gear/sun gear tooth ratios of the planetary gearsets 20 and 40.

The fifth forward speed ratio is established with the engagement of the torque-transmitting mechanisms 50, 52, and 58. During the fifth forward speed ratio, the sun gear member 32 and planet carrier assembly member 46 are rotated in unison with the input shaft 17. The ring gear member 34 is held stationary by the torque-transmitting mechanism 58. The planet carrier assembly member 36 and ring gear member 44 are rotated at a speed determined by the speed of the sun gear member 32 and the ring gear/sun gear tooth ratio of the planetary gearset 30. The sun gear member 42 and therefore output shaft 19 are rotated at a speed determined by the speed of the planet carrier assembly member 46, the speed of the ring gear member 44, and the ring gear/sun gear tooth ratio of the planetary gearset 40. The numerical value of the fifth forward speed ratio is determined by the ring gear/sun gear tooth ratios of the planetary gearsets 30 and 40.

The sixth forward speed ratio is established with the engagement of the torque-transmitting mechanisms 52, 54, and 58. During the sixth forward speed ratio, the planet carrier assembly member 46 is rotated in unison with the input shaft 17 and the ring gear member 34 is held stationary. The ring gear member 24 and sun gear member 32 are rotated at a speed determined by the speed of the planet carrier assembly member 26 and the ring gear/sun gear tooth ratio of the planetary gearset 20. The planet carrier assembly member 26, planet carrier assembly member 36, and ring gear member 44 are rotated at a speed determined by the speed of the sun gear member 32 and the ring gear/sun gear tooth ratio of the planetary gearset 30. The sun gear member 42 and therefore output shaft 19 are rotated at a speed determined by the speed of the planet carrier assembly member 46, the speed of the ring gear member 44, and the ring gear/sun gear tooth ratio of the planetary gearset 40. The numerical value of the sixth forward speed ratio is determined by the ring gear/sun gear tooth ratios of all three planetary gearsets 20, 30, and 40.

It should be noted that the ring gear member 24, sun gear member 32, ring gear member 34, and planet carrier assembly member 46 are not continuously interconnected with other members of the planetary gear arrangement 18 except through the torque-transmitting mechanisms. These members are all termed as noncontinuously connected members.

Figure 3:
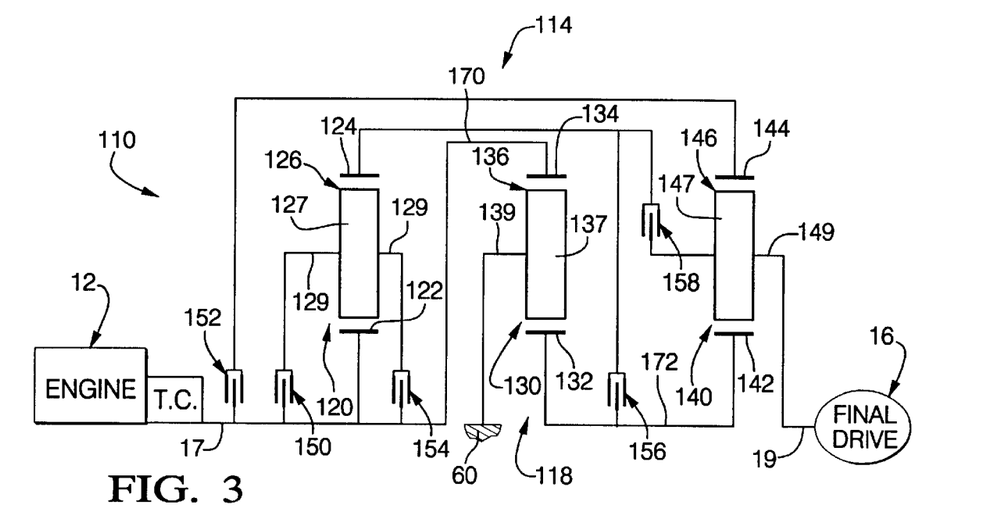
FIG. 3 is a schematic representation of a powertrain incorporating another family of the present invention.

A powertrain 110, shown in FIG. 3, includes the conventional engine and torque converter 12, a planetary transmission 114, and the final 10 drive mechanism 16. The planetary transmission 114 includes the input shaft 17, a planetary gear arrangement 118, and the output shaft 19. The planetary gear arrangement 118 includes three planetary gearsets 120, 130, and 140, and five torque-transmitting mechanisms 150, 152, 154, 156, and 158. All of the torque-transmitting mechanisms are of the rotating type.

The planetary gearset 120 includes a sun gear member 122, a ring gear member 124, and a planet carrier assembly member 126. The planet carrier assembly member 126 includes a plurality of pinion gears 127 rotatably mounted on a planet carrier 129 and disposed in meshing relationship with both the sun gear member 122 and the ring gear member 124.

The planetary gearset 130 includes a sun gear member 132, a ring gear member 134, and a planet carrier assembly member 136. The planet carrier assembly member 136 includes a plurality of pinion gears 137 rotatably mounted on a planet carrier 139 and disposed in meshing relationship with both the sun gear member 132 and the ring gear member 134.

The planetary gearset 140 includes a sun gear member 142, a ring gear member 144, and a planet carrier assembly member 146. The planet carrier assembly member 146 includes a plurality of pinion gears 147 rotatably mounted on a planet carrier 149 and disposed in meshing relationship with both the sun gear member 142 and the ring gear member 144.

The sun gear member 122 and ring gear member 134 are continuously interconnected by an interconnecting member 170. The sun gear member 132 and sun gear member 142 are continuously interconnected by an interconnecting member 172. The output shaft 19 is continuously connected with the planet carrier assembly member 146. The planet carrier assembly member 136 is continuously connected with the transmission housing 60.

The input shaft 17 is selectively connectible with the planet carrier assembly member 126 through the torque-transmitting mechanism 150, and selectively connectible with the ring gear member 144 through the torque-transmitting mechanism 152. The planet carrier assembly member 126 is selectively interconnectible with the interconnecting member 170 through the torque-transmitting mechanism 154. The ring gear member 124 is selectively interconnectible with the interconnecting member 172 through the torque-transmitting mechanism 156. The ring gear member 124 is also selectively connectible with the output shaft 19 through the torque-transmitting mechanism 158.

Figure 4:
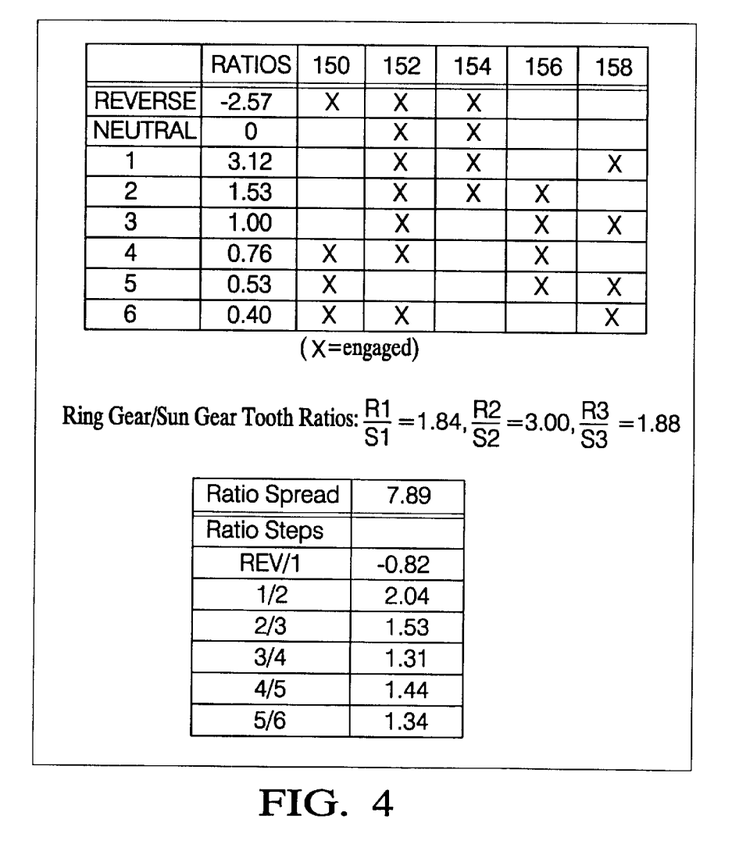
FIG. 4 is a truth table and chart depicting some of the operating characteristics of the family member shown in FIG. 3.

As seen in FIG. 4, the torque-transmitting mechanisms 150, 152, 154, 156, and 158 are selectively connected in combinations of three to establish six forward speed ratios and one reverse speed ratio between the input shaft 17 and the output shaft 19 through the planetary gear arrangement 118. Those skilled in the art will recognize that each of the single step and double step forward interchanges are of the single transition variety. The truth table of FIG. 4 also provides a numerical example of the speed ratios that are available in the planetary gear arrangement 118 when the ring gear/sun gear tooth ratios of the planetary gearsets 120, 130, and 140 are equal to those given as R1/S1, R2/S2, and R3/S3, respectively. Also given in FIG. 4 is the numerical value of the ratio steps between adjacent forward speed ratios as well as between the reverse and first forward speed ratio.

The reverse speed ratio is established with the engagement of the torque-transmitting mechanisms 150, 152, and 154. During the reverse speed ratio, the planetary gearset 120 and ring gear member 134 are rotated in unison with the input shaft 17 as is the ring gear member 144. The sun gear members 132 and 142 are rotated at a speed determined by the speed of the ring gear member 134 and the ring gear/sun gear tooth ratio of the planetary gearset 130. The planet carrier assembly member 146 and therefore output shaft 19 are rotated at a speed determined by the speed of the sun gear member 142, the speed of the ring gear member 144, and the ring gear/sun gear tooth ratio of the planetary gearset 140. The numerical value of the reverse speed ratio is determined by the ring gear/sun gear tooth ratios of the planetary gearsets 130 and 140.

The first forward speed ratio is established with the engagement of the torque-transmitting mechanisms 152, 154, and 158. During the first forward speed ratio, the planetary gearset 120, the ring gear member 134, and the planet carrier assembly member 146 rotate in unison with the output shaft 19. The sun gear members 132 and 142 are rotated at a speed determined by the speed of the ring gear member 144, the speed of the planet carrier assembly member 146, and the ring gear/sun gear tooth ratio of the planetary gearset 140. The ring gear member 134, and therefore the planet carrier assembly member 146, and output shaft 19 are rotated at a speed determined by the speed of the sun gear member 132 and the ring gear/sun gear tooth ratio of the planetary gearset 130. The numerical value of the first forward speed ratio is determined by the ring gear/sun gear tooth ratios of the planetary gearsets 130 and 140.

The second forward speed ratio is established with the engagement of the torque-transmitting mechanisms 152, 154, and 156. During the second forward speed ratio, the planetary gearsets 120 and 130, and sun gear member 142 are held stationary. The planet carrier assembly member 146 and therefore output shaft 19 are rotated at a speed determined by the speed of the ring gear member 144 and the ring gear/sun gear tooth ratio of the planetary gearset 140. The numerical value of the second forward speed ratio is determined by the ring gear/sun gear tooth ratio of the planetary gearset 140.

The third forward speed ratio is established with the engagement of the torque-transmitting mechanisms 152, 156, and 158. During the third forward speed ratio, the planetary gearset 140 and therefore output shaft 19 are driven in unison with the input shaft 17 resulting in a direct drive for the third forward speed ratio having a numerical value of one.

The fourth forward speed ratio is established with the engagement of the torque-transmitting mechanisms 150, 152, and 156. During the fourth forward speed ratio, the sun gear member 122 and ring gear member 134 are rotated at a speed determined by the speed of the planet carrier assembly member 126, the speed of the ring gear member 124, and the ring gear/sun gear tooth ratio of the planetary gearset 120. The sun gear members 132 and 142, and ring gear member 124 are rotated at a speed determined by the speed of the ring gear member 134 and the ring gear/sun gear tooth ratio of the planetary gearset 130. The planet carrier assembly member 146 and therefore output shaft 19 are rotated at a speed determined by the speed of the sun gear member 142, the speed of the ring gear member 144, and the ring gear/sun gear tooth ratio of the planetary gearset 140. The numerical value of the fourth forward speed ratio is determined by the ring gear/sun gear tooth ratios of all three planetary gearsets 120, 130, and 140.

The fifth forward speed ratio is established with the engagement of the torque-transmitting mechanisms 150, 156, and 158. During the fifth forward speed ratio, the sun gear member 122 and ring gear member 134 are rotated at a speed determined by the speed of the planet carrier assembly member 126, the speed of the ring gear member 124, and the ring gear/sun gear tooth ratio of the planetary gearset 120. The sun gear members 132 and 142, ring gear member 124, planet carrier assembly member 146, and output shaft 19 are rotated at a speed determined by the speed of the ring gear member 134 and the ring gear/sun gear tooth ratio of the planetary gearset 130. The numerical of the fifth forward speed ratio is determined by the ring gear/sun gear tooth ratios of the planetary gearsets 120 and 130.

The sixth forward speed ratio is established with the engagement of the torque-transmitting mechanisms 150, 152, and 158. During the sixth forward speed ratio, the sun gear member 122, and ring gear member 134 are rotated at a speed determined by the speed of the planet carrier assembly member 126, the speed of the ring gear member 124, and the ring gear/sun gear tooth ratio of the planetary gearset 120. The sun gear members 132 and 142 are rotated at a speed determined by the speed of the ring gear member 134 and the ring gear/sun gear tooth ratio of the planetary gearset 130. The planet carrier assembly member 146 and therefore output shaft 19 are rotated at a speed determined by the speed of the sun gear member 142, the speed of the ring gear member 144, and the ring gear/sun gear tooth ratio of the planetary gearset 140. The numerical value of the sixth forward speed ratio is established by the ring gear/sun gear tooth ratios of all three planetary gearsets 120, 130, and 140.

The planet carrier assembly member 126, ring gear member 124, and ring gear member 144, are noncontinuously connected members of the planetary gear arrangement 118.

Figure 5:
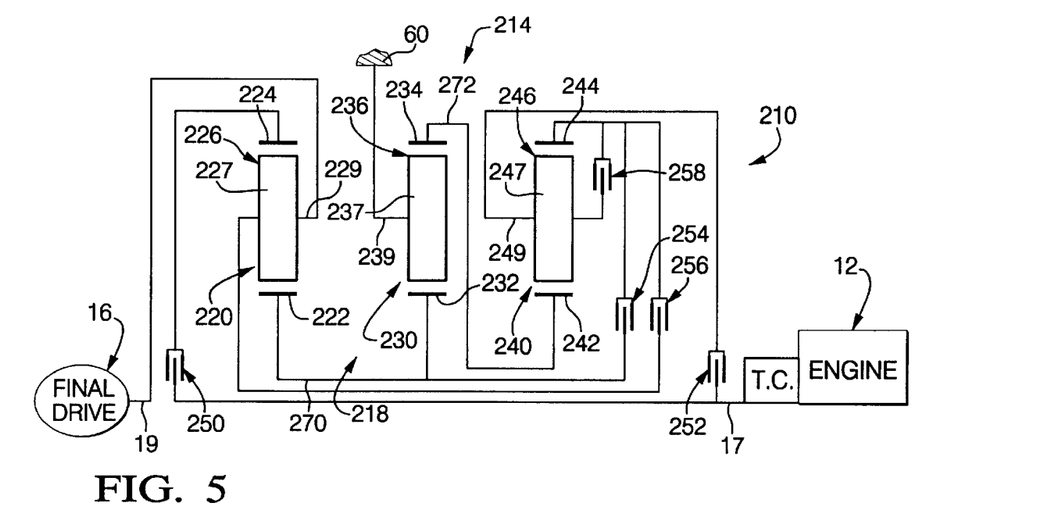
FIG. 5 is a schematic representation of a powertrain incorporating another family of the present invention.

A powertrain 210, shown in FIG. 5, includes the engine and torque converter 12, a planetary transmission 214, and the final drive mechanism 16. The planetary transmission 214 includes the input shaft 17, a planetary gear arrangement 218, and the output shaft 19. The planetary gear arrangement 218 includes three planetary gearsets 220, 230, and 240, and five rotating type torque-transmitting mechanisms 250, 252, 254, 256, and 258.

The planetary gearset 220 includes a sun gear member 222, a ring gear member 224, and a planet carrier assembly member 226. The planet carrier assembly member 226 includes a plurality of pinion gears 227 rotatably mounted on a planet carrier 229 and disposed in meshing relationship with both the sun gear member 222 and the ring gear member 224.

The planetary gearset 230 includes a sun gear member 232, a ring gear member 234, and a planet carrier assembly member 236. The planet carrier assembly member 236 includes a plurality of pinion gears 237 rotatably mounted on a planet carrier 239 and disposed in meshing relationship with both the sun gear member 232 and the ring gear member 234.

The planetary gearset 240 includes a sun gear member 242, a ring gear member 244, and a planet carrier assembly member 246. The planet carrier assembly member 246 includes a plurality of pinion gears 247 rotatably mounted on a planet carrier 249 and disposed in meshing relationship with both the sun gear member 242 and the ring gear member 244.

The sun gear member 222 and sun gear member 232 are continuously interconnected by an interconnecting member 270. The ring gear member 234 and sun gear member 242 are continuously interconnected by an interconnecting member 272. The planet carrier assembly member 226 is continuously connected with the output shaft 19. The planet carrier assembly member 236 is continuously connected with the transmission housing 60. The ring gear member 244, the planet carrier assembly member 246, and the ring gear member 224 are noncontinuously interconnected members.

The input shaft 17 is selectively connectible with the ring gear member 224 through the torque-transmitting mechanism 250, and selectively connectible with the planet carrier assembly member 246 through the torque-transmitting mechanism 252. The ring gear member 244 is selectively connectible with the interconnecting member 270 through the torque-transmitting mechanism 254, selectively connectible with the output shaft 19 through the torque-transmitting mechanism 256, and selectively connectible with the planet carrier assembly member 246 through the torque-transmitting mechanism 258.

Figure 6:
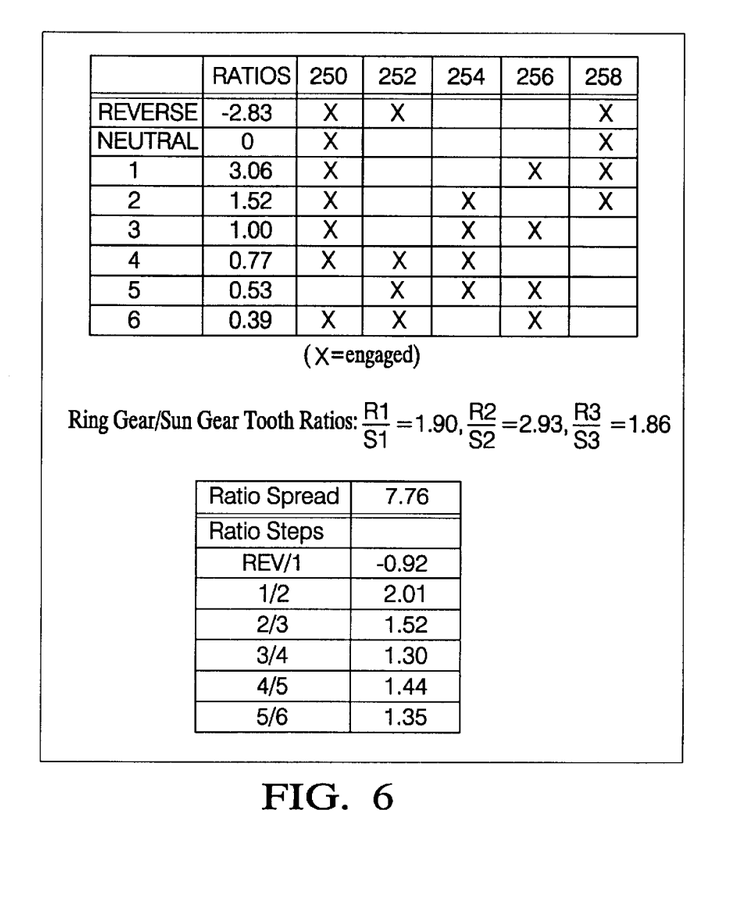
FIG. 6 is a truth table and chart depicting some of the operating characteristics of the family member shown in FIG. 5.

The truth table of FIG. 6 describes the engagement of the torque-transmitting mechanisms to establish six forward speed ratios and one reverse speed ratio between the input shaft 17 and the output shaft 19 through the planetary gear arrangement 218. Also given in the truth table of FIG. 6 is an example of the numerical values for the speed ratios when the ring gear/sun gear tooth ratios of the planetary gearsets 220, 230, and 240 are as given in R1/S1, R2/S2, and R3/S3, respectively. Also given in FIG. 6 is the ratio steps between adjacent forward speed ratios as well as between the reverse and first forward speed ratio. As will be noted in the truth table, each of the single step forward interchanges and the double step forward interchanges are of the single transition variety.

The reverse speed ratio is established with the engagement of the torque-transmitting mechanisms 250, 252, and 258. During the reverse speed ratio, the planetary gearset 240 is rotated as a single unit along with the ring gear member 234 and the input shaft 17. The sun gear members 232 and 222 are rotated at a speed determined by the speed of the ring gear member 234 and the ring gear/sun gear tooth ratio of the planetary gearset 230. The planet carrier assembly member 226 and therefore output shaft 19 are rotated at a speed determined by the speed of the ring gear member 224, the speed of the sun gear member 222, and the ring gear/sun gear tooth ratio of the planetary gearset 220. The numerical value of the reverse speed ratio is determined by the ring gear/sun gear tooth ratios of the planetary gearsets 230 and 220.

The first forward speed ratio is established with the engagement of the torque-transmitting mechanisms 250, 256, and 258. During the first forward speed ratio, the planetary gearset 240 rotates in unison with the ring gear member 234. The sun gear members 222 and 232 are rotated at a speed determined by the speed of the ring gear member 224, the speed of the planet carrier assembly member 226, and the ring gear/sun gear tooth ratio of the planetary gearset 220. The ring gear member 234 and planet carrier assembly member 226, as well as output shaft 19, are rotated at a speed determined by the speed of the sun gear member 232 and the ring gear/sun gear tooth ratio of the planetary gearset 230. The numerical value of the first forward speed ratio is determined by the ring gear/sun gear tooth ratios of the planetary gearsets 220, and 230.

The second forward speed ratio is established with the engagement of the torque-transmitting mechanisms 250, 254, and 258. During the second forward speed ratio, the ring gear member 224 is connected with the input shaft 17 and the sun gear member 222 is effectively connected with the transmission housing 60 through the planetary gearsets 230 and 240. The planet carrier assembly member 226 and, therefore, output shaft 19 are rotated at a speed determined by the speed of the ring gear member 224 and the ring gear/sun gear tooth ratio of the planetary gearset 220. The numerical valve of the second forward speed ratio is determined by the ring gear/sun gear tooth ratio of the planetary gearset 220.

The third forward speed ratio is established with the engagement of the torque-transmitting mechanisms 250, 254, and 256. During the third forward speed ratio, the planetary gearset 220 is rotated in unison with the input shaft 17 resulting in the output shaft 19 also rotating in unison with the input shaft 17. The third forward speed ratio is a direct drive having a numerical value of one.

The fourth forward speed ratio is established with the engagement of the torque-transmitting mechanisms 250, 252, and 254. During the fourth forward speed ratio, the sun gear member 242 and ring gear member 234 are rotated at a speed determined by the speed of the planet carrier assembly member 246, the speed of the ring gear member 244, and the ring gear/sun gear tooth ratio of the planetary gearset 240. The sun gear members 232 and 222 are rotated at a speed determined by the speed of the ring gear member 234 and the ring gear/sun gear tooth ratio of the planetary gearset 230. The planet carrier assembly member 226 and therefore output shaft 19 are rotated at a speed determined by the speed of the sun gear member 222, the speed of the ring gear member 224, and the ring gear/sun gear tooth ratio of the planetary gearset 220. The numerical value of the fourth forward speed ratio is determined by the ring gear/sun gear tooth ratios of all three planetary gearsets 220, 230, and 240.

The fifth forward speed ratio is established with the engagement of the torque-transmitting mechanisms 252, 254, and 256. During the fifth forward speed ratio, the sun gear member 242 and ring gear member 234 are rotated at a speed determined by the speed of the planet carrier assembly member 246, the speed of the ring gear member 244, and the ring gear/sun gear tooth ratio of the planetary gearset 240. The sun gear member 232, ring gear member 244, and planet carrier assembly member 226, as well as output shaft 19, are rotated at a speed determined by the speed of the ring gear member 234 and the ring gear/sun gear tooth ratio of the planetary gearset 230. The numerical value of the fifth forward speed ratio is determined by the ring gear/sun gear tooth ratios of the planetary gearsets 230 and 240.

The sixth forward speed ratio is established with the engagement of the torque-transmitting mechanisms 250, 252, and 256. During the sixth forward speed ratio, the sun gear member 242 and ring gear member 234 are rotated at a speed determined by the speed of the planet carrier assembly member 246, the speed of the ring gear member 244, and the ring gear/sun gear tooth ratio of the planetary gearset 240. The sun gear members 232 and 222 are rotated at a speed determined by the speed of the ring gear member 234 and the ring gear/sun gear tooth ratio of the planetary gearset 230. The planet carrier assembly member 226 and therefore output shaft 19 are rotated at a speed determined by the speed of the sun gear member 222, the speed of the ring gear member 224, and the ring gear/sun gear tooth ratio of the planetary gearset 220. The numerical value of the sixth forward speed ratio is determined by the ring gear/sun gear tooth ratios of all three planetary gearsets 220, 230, and 240.

Figure 7:
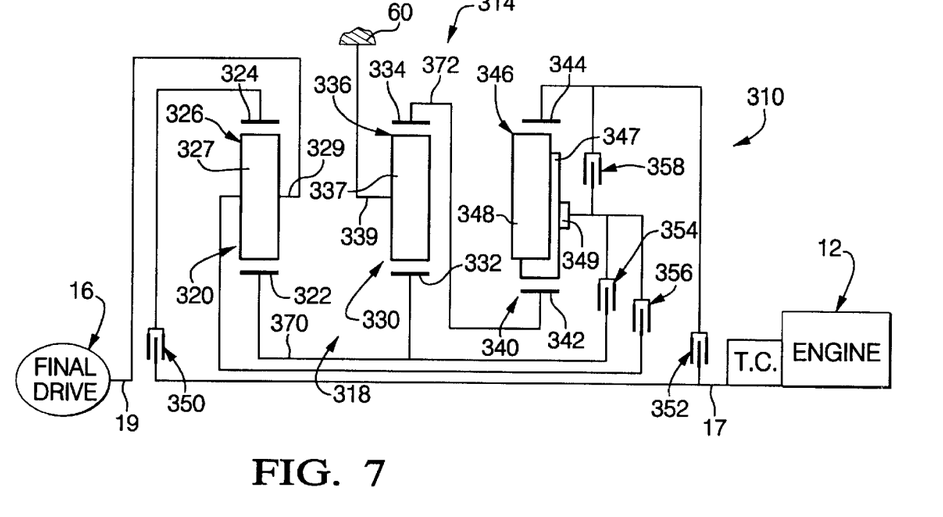
FIG. 7 is a schematic representation of a powertrain incorporating another family of the present invention.

A powertrain 310, shown in FIG. 7, includes the engine and torque converter 12, a planetary transmission 314, and the final drive mechanism 16. The planetary transmission 314 includes the input shaft 17, a planetary gear arrangement 318, and the output shaft 19. The planetary gear arrangement 318 includes three planetary gearsets 320, 330, and 340, and five rotating type torque-transmitting mechanisms 350, 352, 354, 356, and 358.

The planetary gearset 320 includes a sun gear member 322, a ring gear member 324, and a planet carrier assembly member 326. The planet carrier assembly member 326 includes a plurality of pinion gears 327 rotatably mounted on a planet carrier 329 and disposed in meshing relationship with both the sun gear member 322 and the ring gear member 324.

The planetary gearset 330 includes a sun gear member 332, a ring gear member 334, and a planet carrier assembly member 336. The planet carrier assembly member 336 includes a plurality of pinion gears 337 rotatably mounted on a planet carrier 339 and disposed in meshing relationship with both the sun gear member 332 and the ring gear member 334.

The planetary gearset 340 includes a sun gear member 342, a ring gear member 344, and a planet carrier assembly member 346. The planet carrier assembly member 346 includes a plurality of pairs of meshing pinion gears 347 and 348 that are rotatably mounted on a planet carrier 349 and disposed in meshing relationship with the sun gear member 342 and the ring gear member 344, respectively.

The sun gear members 322 and 332 are continuously interconnected by an interconnecting member 370. The ring gear member 334 and sun gear member 342 are continuously interconnected by an interconnecting member 372. The output shaft 19 is continuously connected with the planet carrier assembly member 326. The planet carrier assembly member 336 is continuously connected with the transmission housing 60.

The input shaft 17 is selectively interconnectible with the ring gear member 324 through the torque-transmitting mechanism 350, and selectively interconnectible with the ring gear member 344 through the torque-transmitting mechanism 352. The planet carrier assembly member 346 is selectively connectible with the interconnecting member 370 through the torque-transmitting mechanism 354, selectively connectible with the output shaft 19 through the torque-transmitting mechanism 356, and selectively connectible with the ring gear member 344 through the torque-transmitting mechanism 358. The ring gear member 324, the planet carrier assembly member 346, and the ring gear member 344 are noncontinuously interconnected members.

Figure 8:
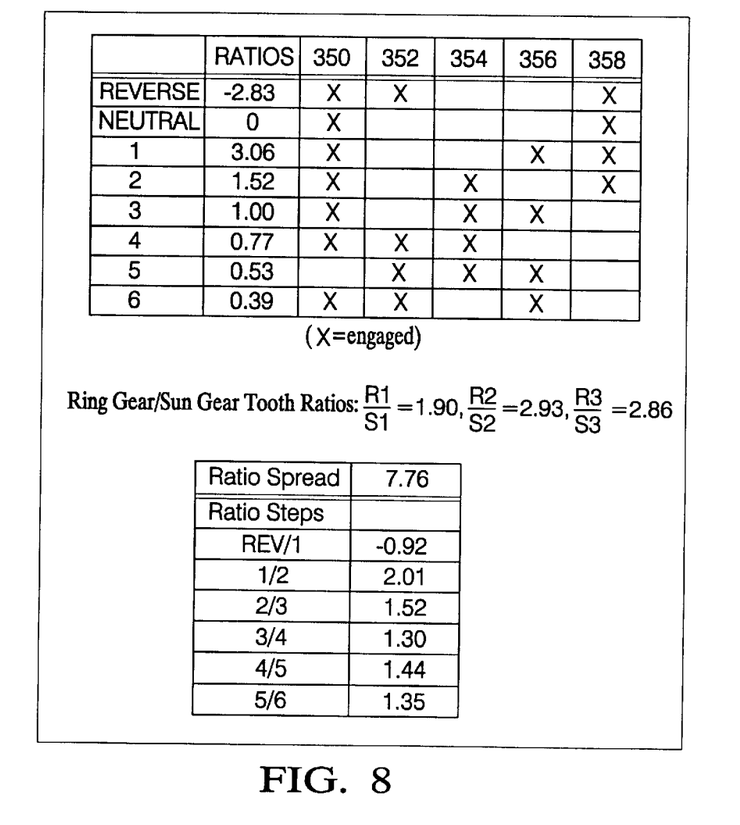
FIG. 8 is a truth table and chart depicting some of the operating characteristics of the family member shown in FIG. 7.

The truth table of FIG. 8 describes the engagement combinations and sequencing of the torque-transmitting mechanisms to establish a reverse speed ratio and six forward speed ratios between the input shaft 17 and the output shaft 19 through the planetary gear arrangement 318. The truth table also provides an example of numerical values for the speed ratios when the ring gear/sun gear tooth ratios of the planetary gearsets 320, 330, and 340 are as shown in the ratios R1/S1, R2/S2, and R3/S3, respectively. FIG. 8 also has a chart that describes the ratio steps between the adjacent forward speed ratios and between the reverse and first forward speed ratio when the example ring gear/sun gear tooth ratios are utilized.

The reverse speed ratio is established with the engagement of the torque-transmitting mechanisms 350, 352, and 358. During the reverse speed ratio, the planetary gearset 340 and ring gear members 324 and 334 are driven in unison with the input shaft 17. The sun gear members 332 and 322 are rotated at a speed determined by the speed of the ring gear member 334 and the ring gear/sun gear tooth ratio of the planetary gearset 330. The planet carrier assembly member 326 and therefore output shaft 19 are rotated at a speed determined by the speed of the ring gear member 324, the speed of the sun gear member 322, and the ring gear/sun gear tooth ratio of the planetary gearset 320. The numerical value of the reverse speed ratio is determined by the ring gear/sun gear tooth ratios of the planetary gearsets 330 and 320.

The first forward speed ratio is established with the engagement of the torque-transmitting mechanisms 350, 356, and 358. During the first forward speed ratio, the sun gear members 332 and 322 are rotated at a speed determined by the speed of the ring gear member 334 and the ring gear/sun gear tooth ratio of the planetary gearset 330. The planet carrier assembly member 326 and therefore output shaft 19 are rotated at a speed determined by the speed of the sun gear member 322, the speed of the ring gear member 324, and the ring gear/sun gear tooth ratio of the planetary gearset 320. The numerical value of the first forward speed ratio is determined by the ring gear/sun gear tooth ratios of the planetary gearsets 320 and 330.

The second forward speed ratio is established with the engagement of the torque-transmitting mechanisms 350, 354, and 358. During the second forward speed ratio, the sun gear member 322 is grounded through the combination of engagements of the torque-transmitting mechanisms 354 and 358, and the grounded member 336 of the planetary gearset 330. The planet carrier assembly member 326 and therefore output shaft 19 are rotated at a speed determined by the speed of the ring gear member 324 and the ring gear/sun gear tooth ratio of the planetary gearset 320. The numerical value of the second forward speed ratio is determined by the ring gear/sun gear tooth ratio of the planetary gearset 320.

The third forward speed ratio is established with the engagement of the torque-transmitting mechanisms 350, 354, and 356. During the third forward speed ratio, the planet carrier assembly member 326 and sun gear member 322 are interconnected through the torque-transmitting mechanisms 354 and 356. The planetary gearset 320 therefore rotates in unison with the input shaft 17, which results in a 1:1 ratio between the input shaft 17 and the output shaft 19. The numerical value of the third forward speed ratio is one.

The fourth forward speed ratio is established with the engagement of the torque-transmitting mechanisms 350, 352, and 354. During the fourth forward speed ratio, the sun gear member 342 and ring gear member 334 are rotated at a speed determined by the speed of the ring gear member 344, the speed of the planet carrier assembly member 346, and the ring gear/sun gear tooth ratio of the planetary gearset 340. The sun gear members 332 and 322 are rotated at a speed determined by the speed of the ring gear member 334 and the ring gear/sun gear tooth ratio of the planetary gearset 330. The planet carrier assembly member 326 and therefore output shaft 19 are rotated at a speed determined by the speed of the sun gear member 322, the speed of the ring gear member 324, and the ring gear/sun gear tooth ratio of the planetary gearset 320. The numerical value of the fourth forward speed ratio is determined by the ring gear/sun gear tooth ratios of all three planetary gearsets 320, 330, and 340.

The fifth forward speed ratio is established with the engagement of the torque-transmitting mechanisms 352, 354, and 356. During the fifth forward speed ratio, the sun gear member 342 and ring gear member 334 are rotated at a speed determined by the speed of the ring gear member 344, the speed of the planet carrier assembly member 346, and the ring gear/sun gear tooth ratio of the planetary gearset 340. The sun gear member 332, planet carrier assembly member 346, planet carrier assembly member 326, and output shaft 19 are rotated at a speed determined by the speed of the ring gear member 334 and the ring gear/sun gear tooth ratio of the planetary gearset 330. The numerical value of the fifth forward speed ratio is determined by the ring gear/sun gear tooth ratios of the planetary gearsets 330 and 340.

The sixth forward speed ratio is established with the engagement of the torque-transmitting mechanisms 350, 352, and 356. During the sixth forward speed ratio, the ring gear member 334 and sun gear member 342 are rotated at a speed determined by the speed of the ring gear member 344, the speed of the planet carrier assembly member 346, and the ring gear/sun gear tooth ratio of the planetary gearset 340. The sun gear members 332 and 322 are rotated at a speed determined by the speed of the ring gear member 334 and the ring gear/sun gear tooth ratio of the planetary gearset 330. The planet carrier assembly member 326 and therefore output shaft 19 are rotated at a speed determined by the speed of the ring gear member 324, the speed of the sun gear member 322, and the ring gear/sun gear tooth ratio of the planetary gearset 320. The numerical value of the sixth forward speed ratio is determined by the ring gear/sun gear tooth ratios of all three planetary gearsets 320, 330, and 340.

Figure 9:
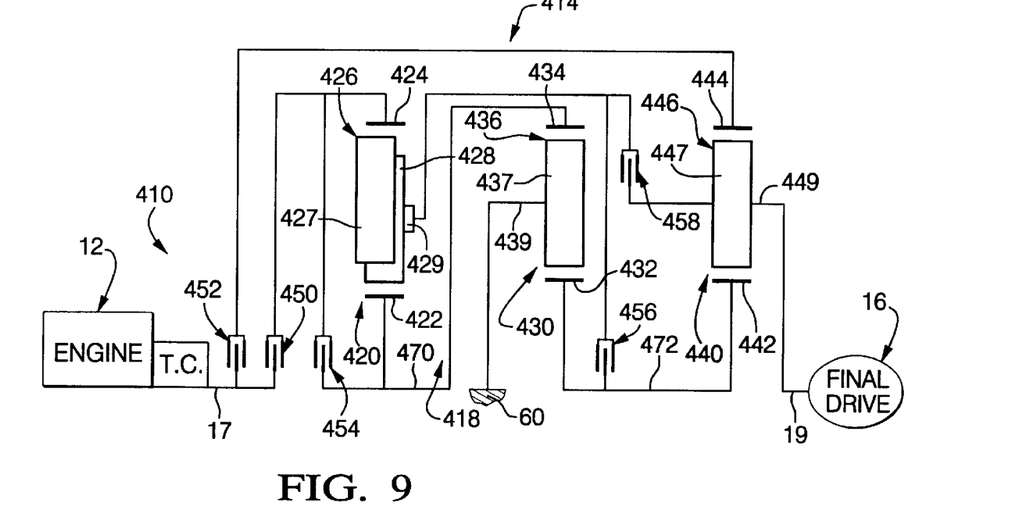
FIG. 9 is a schematic representation of a powertrain incorporating another family of the present invention.

A powertrain 410, shown in FIG. 9, includes the engine and torque converter 12, a planetary transmission 414, and the final drive mechanism 16. The planetary transmission 414 includes the input shaft 17, a planetary gear arrangement 418, and the output shaft 19. The planetary gear arrangement 418 includes three planetary gearsets 420, 430, and 440, and five rotating type torque-transmitting mechanisms 450, 452, 454, 456, and 458.

The planetary gearset 420 includes a sun gear member 422, a ring gear member 424, and a planet carrier assembly member 426. The planet carrier assembly member 426 includes pairs of meshing pinion gears 427 and 428 rotatably mounted on a planet carrier 429 and disposed in meshing relationship with both the sun gear member 422 and the ring gear member 424, respectively.

The planetary gearset 430 includes a sun gear member 432, a ring gear member 434, and a planet carrier assembly member 436. The planet carrier assembly member 436 includes a plurality of pinion gears 437 rotatably mounted on a planet carrier 439 and disposed in meshing relationship with both the sun gear member 432 and the ring gear member 434.

The planetary gearset 440 includes a sun gear member 442, a ring gear member 444, and a planet carrier assembly member 446. The planet carrier assembly member 446 includes a plurality of pinion gears 447 rotatably mounted on a planet carrier 449 and disposed in meshing relationship with both the sun gear member 442 and the ring gear member 444.

The sun gear member 422 and ring gear member 434 are continuously interconnected by an interconnecting member 470. The sun gear member 432 and sun gear member 442 are continuously interconnected by an interconnecting member 472. The planet carrier assembly member 436 is continuously connected with the transmission housing 60. The output shaft 19 is continuously connected with the planet carrier assembly member 446. The ring gear member 424, the planet carrier assembly member 426, and ring gear member 444 are noncontinuously interconnected members.

The input shaft 17 is selectively interconnectible with the ring gear member 424 through the torque-transmitting mechanism 450, and selectively interconnectible with the ring gear member 444 through the torque-transmitting mechanism 452. The ring gear member 424 is selectively interconnectible with the interconnecting member 470 through the torque-transmitting mechanism 454. The planet carrier assembly member 426 is selectively interconnectible with the interconnecting member 472 through the torque-transmitting mechanism 456, and selectively connectible with the output shaft 19 through the torque-transmitting mechanism 458.

Figure 10:
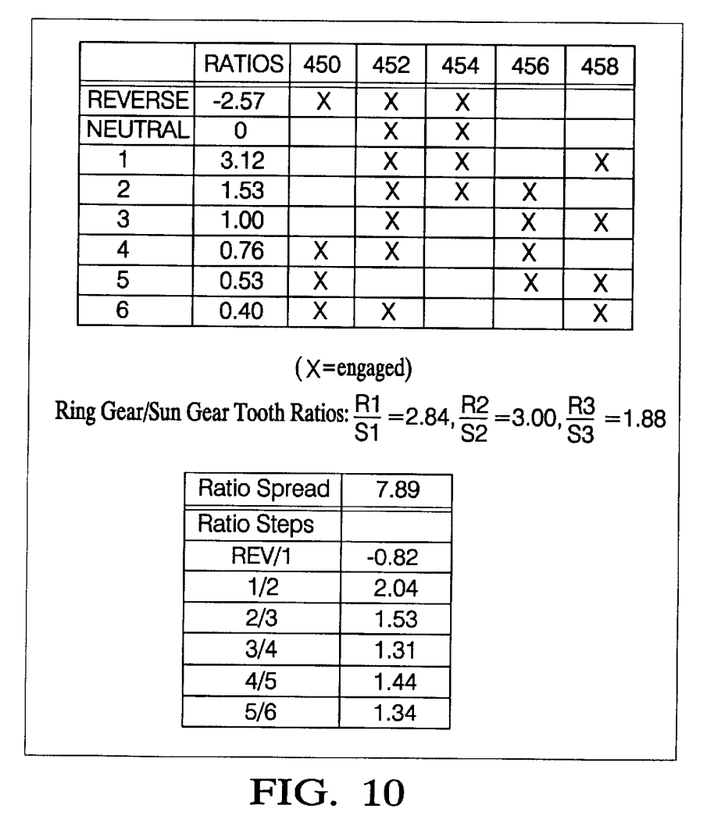
FIG. 10 is a truth table and chart depicting some of the operating characteristics of the family member shown in FIG. 9.

The truth table of FIG. 10 describes the engagement combinations and sequencing for the torque-transmitting mechanisms in order to establish six forward speed ratios and one reverse speed ratio between the input shaft 17 and the output shaft 19 through the planetary gear arrangement 418. The truth table also provides a numerical example of the speed ratios that are possible with the planetary gear arrangement 418 when the ring gear/sun gear tooth ratios of the planetary gearsets 420, 430, and 440 are selected as shown in R1/S1, R2/S2, and R3/S3, respectively. Also described in FIG. 10 is a numerical example of the ratio steps between adjacent forward speed ratios and between the reverse and first forward speed ratio when the given ring gear/sun gear tooth ratios are utilized.

The reverse speed ratio is established with the engagement of the torque-transmitting mechanisms 450, 452, and 454. During the reverse speed ratio, the ring gear member 434 is driven by the input shaft 17. The sun gear members 432 and 442 are rotated at a speed determined by the speed of the ring gear member 434 and the ring gear/sun gear tooth ratio of the planetary gearset 430. The planet carrier assembly member 446 and output shaft 19 are rotated at a speed determined by the speed of the sun gear member 442, the speed of the ring gear member 444, and the ring gear/sun gear tooth ratio of the planetary gearset 440. The numerical value of the reverse speed ratio is determined by the ring gear/sun gear tooth ratios of the planetary gearsets 430 and 440.

The first forward speed ratio is established with the engagement of the torque-transmitting mechanisms 452, 454, and 458. During the first forward speed ratio, the sun gear members 442 and 432 are rotated at a speed determined by the speed of the ring gear member 444, the speed of the planet carrier assembly member 446, and the ring gear/sun gear tooth ratio of the planetary gearset 440. The ring gear member 434, planetary gearset 420, and planet carrier assembly member 446, as well as output shaft 19, are driven at a speed determined by the speed of the sun gear member 432 and the ring gear/sun gear tooth ratio of the planetary gearset 430. The numerical value of the first forward speed ratio is determined by the ring gear/sun gear tooth ratios of the planetary gearsets 430 and 440.

The second forward speed ratio is established with the engagement of the torque-transmitting mechanisms 452, 454, and 456. During the second forward speed ratio, the sun gear member 442 is held stationary. The ring gear member 444 is driven by the input shaft 17. The planet carrier assembly member 446 and output shaft 19 are rotated at a speed determined by the speed of the ring gear member 444 and the ring gear/sun gear tooth ratio of the planetary gearset 440. The numerical value of the second forward speed ratio is determined by the ring gear/sun gear tooth ratio of the planetary gearset 440.

The third forward speed ratio is established with the engagement of the torque-transmitting mechanisms 452, 456, and 458. The third forward speed ratio is a direct drive wherein the input shaft 17 and output shaft 19 are rotated in unison. Therefore, the numerical value of the third forward speed ratio is one.

The fourth forward speed ratio is established with the engagement of the torque-transmitting mechanisms 450, 452, and 456. During the fourth forward speed ratio, the sun gear member 422 and ring gear member 434 are rotated at a speed determined by the speed of the ring gear member 424, the speed of the planet carrier assembly member 426, and the ring gear/sun gear tooth ratio of the planetary gearset 420. The sun gear members 432 and 442 are rotated at a speed determined by the speed of the ring gear member 434 and the ring gear/sun gear tooth ratio of the planetary gearset 430. The planet carrier assembly member 446 and output shaft 19 are rotated at a speed determined by the speed of the sun gear member 442, the speed of the ring gear member 444, and the ring gear/sun gear tooth ratio of the planetary gearset 440. The numerical value of the fourth forward speed ratio is determined by the ring gear/sun gear tooth ratios of all three planetary gearsets 420, 430, and 440.

The fifth forward speed ratio is established with the engagement of the torque-transmitting mechanisms 450, 456, and 458. During the fifth forward speed ratio, the planetary gearset 440 rotates as a unit with the output shaft 19. The sun gear member 422 and ring gear member 434 are rotated at a speed determined by the speed of the ring gear member 424, the speed of the planet carrier assembly member 426, and the ring gear/sun gear tooth ratio of the planetary gearset 420. The sun gear members 432 and 442, and therefore output shaft 19, are rotated at a speed determined by the speed of the ring gear member 434 and the ring gear/sun gear tooth ratio of the planetary gearset 430. The numerical value of the fifth forward speed ratio is determined by the ring gear/sun gear tooth ratios of the planetary gearsets 420 and 430.

The sixth forward speed ratio is established with the engagement of the torque-transmitting mechanisms 450, 452, and 458. During the sixth forward speed ratio, the sun gear member 422 and ring gear member 434 are rotated at a speed determined by the speed of the ring gear member 424, the speed of the planet carrier assembly member 426, and the ring gear/sun gear tooth ratio of the planetary gearset 420. The sun gear members 432 and 442 are rotated at a speed determined by the speed of the ring gear member 434 and the ring gear/sun gear tooth ratio of the planetary gearset 430. The planet carrier assembly member 446 and therefore output shaft 19 are rotated at a speed determined by the speed of the ring gear member 444, the speed of the sun gear member 442, and the ring gear/sun gear tooth ratio of the planetary gearset 440. The numerical value of the sixth forward speed ratio is determined by the ring gear/sun gear tooth ratios of all three planetary gearsets 420, 430, and 440.

Figure 11:
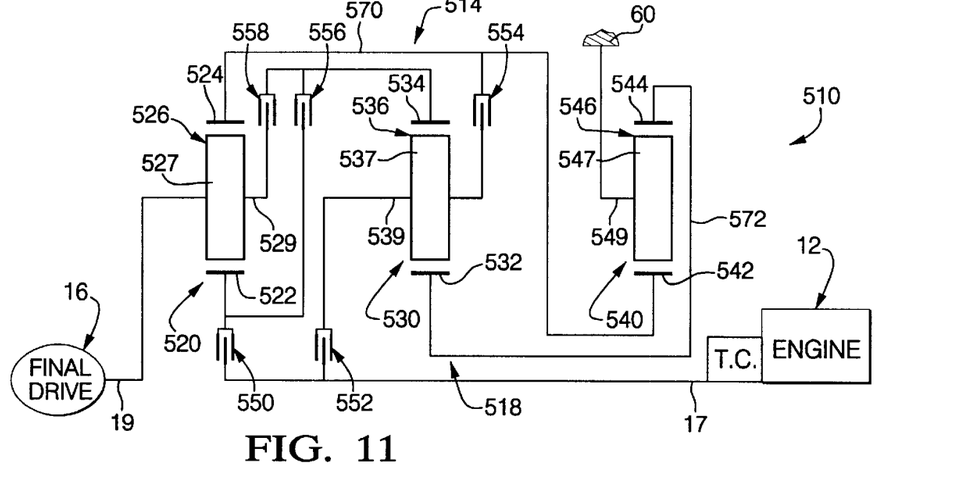
FIG. 11 is a schematic representation of a powertrain incorporating another family of the present invention.

A powertrain 510, shown in FIG. 11, includes the engine and torque converter 12, a planetary transmission 514, and the final drive mechanism 16. The planetary transmission 514 includes the input shaft 17, a planetary gear arrangement 518, and the output shaft 19. The planetary gear arrangement 518 includes three planetary gearsets 520, 530, and 540, and five rotating type torque-transmitting mechanisms 550, 552, 554, 556, and 558.

The planetary gearset 520 includes a sun gear member 522, a ring gear member 524, and a planet carrier assembly member 526. The planet carrier assembly member 526 includes pairs of meshing pinion gears 527 and 528 rotatably mounted on a planet carrier 529 and disposed in meshing relationship with both the sun gear member 522 and the ring gear member 524, respectively.

The planetary gearset 530 includes a sun gear member 532, a ring gear member 534, and a planet carrier assembly member 536. The planet carrier assembly member 536 includes a plurality of pinion gears 537 rotatably mounted on a planet carrier 539 and disposed in meshing relationship with both the sun gear member 532 and the ring gear member 534.

The planetary gearset 540 includes a sun gear member 542, a ring gear member 544, and a planet carrier assembly member 546. The planet carrier assembly member 546 includes a plurality of pinion gears 547 rotatably mounted on a planet carrier 549 and disposed in meshing relationship with both the sun gear member 542 and the ring gear member 544.

The sun gear member 542 and ring gear member 524 are continuously interconnected by an interconnecting member 570. The sun gear member 532 and ring gear member 544 are continuously interconnected by an interconnecting member 572. The planet carrier assembly member 546 is continuously connected with the transmission housing 60. The output shaft 19 is continuously connected with the planet carrier assembly member 526. The sun gear member 522, the planet carrier assembly member 526, and ring gear member 534 are noncontinuously interconnected members.

The input shaft 17 is selectively interconnectable with the sun gear member 522 through the torque-transmitting mechanism 550, and selectively interconnectable with the planet carrier assembly member 536 through the torque-transmitting mechanism 552. The planet carrier assembly member 536 is selectively interconnectable with the interconnecting member 570 through the torque-transmitting mechanism 554. The ring gear member 534 is selectively interconnectable with the sun gear member 522 through the torque-transmitting mechanism 556, and selectively connectible with the output shaft 19 through the torque-transmitting mechanism 558.

Figure 12:
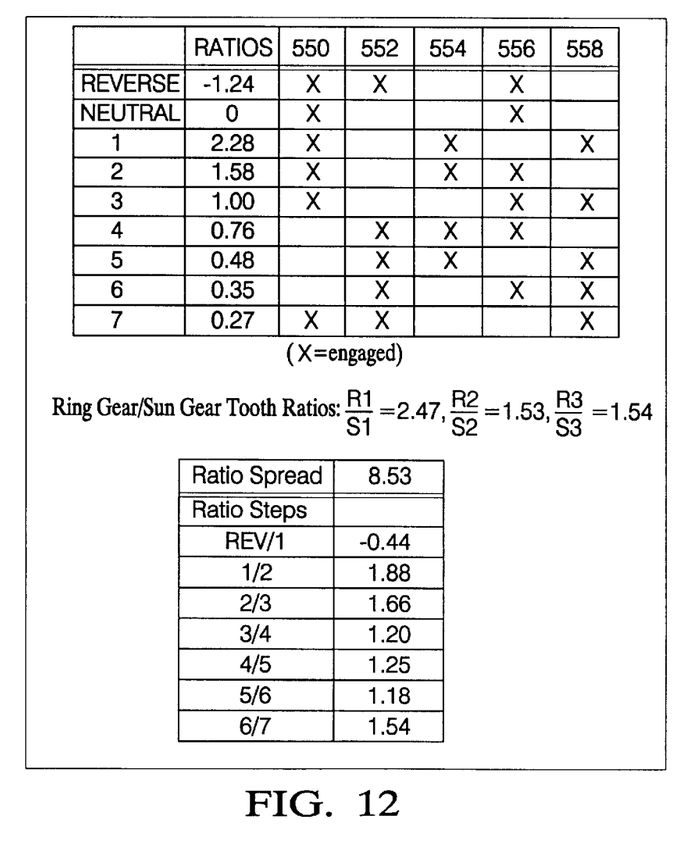
FIG. 12 is a truth table and chart depicting some of the operating characteristics of the family member shown in FIG. 11.

The truth table of FIG. 12 describes the engagement combinations and sequencing for the torque-transmitting mechanisms in order to establish six forward speed ratios and one reverse speed ratio between the input shaft 17 and the output shaft 19 through the planetary gear arrangement 518. The truth table also provides a numerical example of the speed ratios that are possible with the planetary gear arrangement 518 when the ring gear/sun gear tooth ratios of the planetary gearsets 520, 530, and 540 are selected as shown in R1/S1, R2/S2, and R3/S3, respectively. Also described in FIG. 12 is a numerical example of the ratio steps between adjacent forward speed ratios and between the reverse and first forward speed ratio when the given ring gear/sun gear tooth ratios are utilized.

The reverse speed ratio is established with the engagement of the torque-transmitting mechanisms 550, 552, and 556. During the reverse speed ratio, the sun gear member 522 and planetary gearset 530 rotate in unison with the input shaft 17. The sun gear member 542 is rotated at a speed determined by the speed of the ring gear member 544 and the ring gear/sun gear tooth ratio of the planetary gearset 540. The planet carrier assembly member 526 and output shaft 19 are rotated at a speed determined by the speed of the sun gear member 522, the speed of the ring gear member 524, and the ring gear/sun gear tooth ratio of the planetary gearset 520. The numerical value of the reverse speed ratio is determined by the ring gear/sun gear tooth ratios of the planetary gearsets 520 and 540.

The first forward speed ratio is established with the engagement of the torque-transmitting mechanisms 550, 554, and 558. During the first forward speed ratio, the sun gear member 532 and ring gear member 544 are rotated at a speed determined by the speed of the planet carrier assembly 536, and the ring gear/sun gear tooth ratio of the planetary gearset 540. The ring gear member 534 and output shaft 19 are driven at a speed determined by the speed of the sun gear member 532, the speed of the planet carrier assembly 536 and the ring gear/sun gear tooth ratio of the planetary gearset 530. The speed of the planet carrier assembly 536 is determined by the speed of the planet carrier assembly 526, the speed of the sun gear member 522 and the ring gear/sun gear tooth ratio of the planetary gearset 520. The numerical value of the first forward speed ratio is determined by the ring gear/sun gear tooth ratios of all three planetary gearsets 520, 530 and 540.

The second forward speed ratio is established with the engagement of the torque-transmitting mechanisms 550, 554, and 556. During the second forward speed ratio, both the sun gear member 522 and ring gear member 534 are driven by the input shaft 17. The speed of the sun gear member 532 and ring gear member 544 is determined by the speed of the planet carrier assembly member 536 and the ring gear/sun gear tooth ratio of the planetary gearset 540. The speed of the planet carrier assembly 536 is determined by the speed of the ring gear member 534, the speed of the sun gear member 532, and the ring gear/sun gear tooth ratio of the planetary gearset 530. The speed of the output shaft 19 is determined by the speed of the ring gear member 524, the speed of the sun gear member 522, and the ring gear/sun gear tooth ratio of the planetary gearset 520. The numerical value of the second forward speed ratio is determined by the ring gear/sun gear tooth ratio of all three planetary gearsets 520, 530 and 540.

The third forward speed ratio is established with the engagement of the torque-transmitting mechanisms 550, 556, and 558. The third forward speed ratio is a direct drive wherein the input shaft 17 and output shaft 19 are rotated in unison. Therefore, the numerical value of the third forward speed ratio is one.

The fourth forward speed ratio is established with the engagement of the torque-transmitting mechanisms 552, 554, and 556. During the fourth forward speed ratio, the input shaft 17 drives the planet carrier assembly 536, the sun gear member 542 and the ring gear member 524. The speed of the sun gear member 532 and the ring gear member 544 is determined by the speed of the planet carrier assembly 536 and the ring gear/sun gear tooth ratio of the planetary gearset 540. The ring gear member 534 and the sun gear member 522 are both rotated at a speed determined by the speed of the sun gear member 532, the speed of the planet carrier assembly 536 and the ring gear/sun gear tooth ratio of the planetary gearset 530. The planet carrier assembly member 526 and output shaft 19 are rotated at a speed determined by the speed of the sun gear member 522, the speed of the ring gear member 524, and the ring gear/sun gear tooth ratio of the planetary gearset 520. The numerical value of the fourth forward speed ratio is determined by the ring gear/sun gear tooth ratios of all three planetary gearsets 520, 530, and 540.

The fifth forward speed ratio is established with the engagement of the torque-transmitting mechanisms 552, 554, and 558. During the fifth forward speed ratio, the planet carrier assembly 536 and the sun gear member 542 rotate at the speed of the input shaft 17. The sun gear member 532 and ring gear member 544 are rotated at a speed determined by the speed of the planet carrier assembly 536 and the ring gear/sun gear tooth ratio of the planetary gearset 540. The speed of the ring gear member 534, and therefore output shaft 19, is determined by the speed of the sun gear member 532, the speed of the planet carrier assembly 536 and the ring gear/sun gear tooth ratio of the planetary gearset 530. The numerical value of the fifth forward speed ratio is determined by the ring gear/sun gear tooth ratios of the planetary gearsets 530 and 540.

The sixth forward speed ratio is established with the engagement of the torque-transmitting mechanisms 552, 556, and 558. During the sixth forward speed ratio, the sun gear member 542, the planetary gear set 520, and therefore the output shaft 19, rotate in unison with the ring gear member 534. The speed of the ring gear member 544 is determined by the speed of the sun gear member 542 and the ring gear/sun gear tooth ratio of the planetary gearset 540. The ring gear member 534 is rotated at a speed determined by the speed of the sun gear member 532, the speed of the planet carrier assembly 536 and the ring gear/sun gear tooth ratio of the planetary gearset 530. The numerical value of the sixth forward speed ratio is determined by the ring gear/sun gear tooth ratios of the planetary gearsets 530 and 540.

The seventh forward speed ratio is established with the engagement of the torque-transmitting mechanisms 550, 552 and 558. During the seventh forward speed ratio, the planet carrier assembly 536 and the sun gear member 522 are both driven by the input shaft. The ring gear member 544 and sun gear member 532 rotate at a speed determined by the speed of the sun gear member 542 and the ring gear/sun gear tooth ratio of the planetary gearset 540. The speed of the ring gear member 534 and output shaft 19 is determined by the speed of the planet carrier assembly 536, the speed of the sun gear member 532, and the ring gear/sun gear tooth ratio of the planetary. gearset 530. The ring gear member 524 rotates at a speed determined by the speed of the sun gear member 522, the planet carrier assembly 526, and the ring gear/sun gear tooth ratio of the planetary gearset 520. Therefore, the seventh forward speed ratio is determined by the ring gear/sun gear tooth ratios of all three planetary gearsets 520, 530 and 540.

From the above descriptions of the family members, it should now be apparent that each family member has a member of the first planetary gearset continuously interconnected with a member of the second planetary gearset, and the second planetary gearset has a member continuously interconnected with a member of the third planetary gearset. Also, either the first planetary gearset or second planetary gearset has a member continuously connect with the transmission housing. The transmission output shaft is continuously connected with a member of either the first or third planetary gearset. Two input clutches are utilized to interconnect the transmission input shaft with members of the first, second, or third planetary gearset.

Two other rotating type torque-transmitting mechanisms are employed to interconnect members of the planetary gearsets to either provide a drive connection or a lock up connection within a single planetary gearset. A fifth of the torque-transmitting mechanisms is employed to selectively interconnect members of the three planetary gearsets to the output shaft, to the housing, or to a member of one of the planetary gearsets.

What is claimed is:

1. A family of multi-speed transmission mechanism, each family member comprising:
   an input shaft;
   an output shaft;
   a transmission housing;
   a planetary gear arrangement having a first planetary gearset, a second planetary gearset, a third planetary gearset, a first interconnecting member, a second interconnecting member, and five torque transmitting mechanisms;
   said first planetary gearset having a first member, a second member, and a third member; said second planetary gearset having a first member, a second member, and a third member; said third planetary gearset having a first member, a second member, and a third member;
   said first interconnecting member continuously interconnecting said first member of said first planetary gearset and said first member of said second planetary gearset;
   said second interconnecting member continuously interconnecting one of said first and second members of said second planetary gearset with said first member of said third planetary gearset;
   said transmission housing being continuously interconnected with one member of a group consisting of said second member of said first planetary gearset and said third member of said second planetary gearset;
   said output shaft being continuously interconnected with at least one member of said planetary gearsets;
   a first of said torque transmitting mechanisms selectively interconnecting said input shaft with one member of a group consisting of a member of said first planetary gearset, a member of said second planetary gearset, and a member of said third planetary gearset;
   a second of said torque transmitting mechanisms selectively interconnecting said input shaft with one member of a group consisting of a member of said first planetary gearset, a member of said second planetary gearset, a member of said third planetary gearset, said first interconnecting member, and said second interconnecting member;
   a third of said torque transmitting mechanisms selectively interconnecting one member of a group consisting of a member of said first planetary gearset, a member of said second planetary gearset, and a member of said third planetary gearset with one member of a group consisting of said input shaft, another member of said first planetary gearset, another member of said second planetary gearset, and another member of said third planetary gearset;
   a fourth of said torque transmitting mechanisms selectively interconnecting one member of said second planetary gearset or one member of said third planetary gearset with a member of said first planetary gearset, a member of said second planetary gearset, or a member of said third planetary gearset;
   a fifth of said torque transmitting mechanisms selectively interconnecting a member of a group consisting of one member of one of said planetary gearsets with a member of a group consisting of another member of one of said planetary gearsets and said transmission housing;
   said five torque transmitting mechanisms being selectively engageable in combinations of three to establish at least six forward speed ratios and one reverse speed ratio in said planetary gear arrangement between said input shaft and said output shaft.

2. The family of transmissions defined in claim 1 further wherein:
   said first member of each of said planetary gearsets is a member of a group consisting of a sun gear member, a ring gear member, and a planet carrier assembly member;
   said second member of each of said planetary gearsets is a member of a group consisting of a sun gear member, a ring gear member, and a planet carrier assembly member that is not said respective first member; and
   said third member of each of said planetary gearsets is a member of a group consisting of a sun gear member, a ring gear member, and a planet carrier assembly member that is not said respective first member and said respective second member.

3. A family of transmissions having a plurality of family members comprising:
   an input member;
   an output member;
   a transmission housing;

a first planetary gearset having a first member, a second member, and a third member;

a second planetary gearset having a first member, a second member, and a third member;

a third planetary gearset having a first member, a second member, and a third member;

a first interconnection continuously interconnecting said first member of said first planetary gearset and said first member of said second planetary gearset;

a second interconnection continuously interconnecting one of said first and second members of said second planetary gearset with said first member of said third planetary gearset;

said output member being continuously interconnected with a member of a group consisting of said second member of said first planetary gearset and said second member of said third planetary gearset;

said transmission housing being continuously interconnected with a member of a group consisting of said second member of said first planetary gearset and said third member of said second planetary gearset;

a first selectively engageable torque transmitting mechanism selectively interconnecting said input member with a member of a group consisting of said second member of said first planetary gearset, said second member of said second planetary gearset, and said third member of said first planetary gearset;

a second selectively engageable torque transmitting mechanism selectively interconnecting said input member with a member of a group consisting of said second member of said third planetary gearset and said third member of said third planetary gearset;

a third selectively engageable torque transmitting mechanism selectively interconnecting a member of a group consisting of said first interconnection and said second member of said second planetary gearset with a member of a group consisting of said input shaft, said second and third members of said first planetary gearset, and said third member of said third planetary gearset;

a fourth selectively engageable torque transmitting mechanism selectively interconnecting a member of a group consisting of said third members of said first and third planetary gearsets with a member of a group consisting of said third member of said second planetary gearset, said second interconnection, and said output member;

a fifth selectively engageable torque transmitting mechanism selectively interconnecting a member of a group consisting of said transmission housing, said output member, and said second member of said third planetary gearset with a member of a group consisting of said third members of said first, second, and third planetary gearsets; and said five torque transmitting mechanisms being selectively engaged in combinations of three to establish at least six forward speed ratios and one reverse speed ratio between said input member and said output member.

4. A family of multi-speed transmission mechanism, each family member comprising:

an input shaft;

an output shaft;

a transmission housing;

a planetary gear arrangement having a first planetary gearset, a second planetary gearset, a third planetary gearset, a first interconnecting member, a second interconnecting member, and five torque transmitting mechanisms;

said first planetary gearset having a first member, a second member, and a third member; said second planetary gearset having a first member, a second member, and a third member; said third planetary gearset having a first member, a second member, and a third member;

said first interconnecting member continuously interconnecting said first member of said first planetary gearset and said first member of said second planetary gearset;

said second interconnecting member continuously interconnecting one of said first and second members of said second planetary gearset with said first member of said third planetary gearset;

said transmission housing being continuously interconnected with one member of a group consisting of said second member of said first planetary gearset and said third member of said second planetary gearset;

said output shaft being continuously interconnected with at least one member of said planetary gearsets; said input shaft being non-continuously interconnected with any member of said planetary gearsets;

said five selectively engageable torque transmitting mechanisms connecting members of said planetary gearsets with said input shaft, said transmission housing, or other members of said planetary gearsets; and said torque transmitting mechanisms being selectively engaged in combinations of three to establish at least six forward speed ratios and a reverse speed ratio between said input shaft and said output shaft.

* * * * *